United States Patent [19]
Brown et al.

[11] Patent Number: 5,299,220
[45] Date of Patent: Mar. 29, 1994

[54] SLAB LASER

[76] Inventors: David C. Brown, R.R. #1, Box 356J Brittan Rd., Brackney, Pa. 18812; David P. Benfey, 412 Boswell Hill Rd., Endicott, N.Y. 13760

[21] Appl. No.: 941,832

[22] Filed: Sep. 8, 1992

[51] Int. Cl.$^5$ .................. H01S 3/091; H01S 3/092
[52] U.S. Cl. ............................... 372/71; 372/95
[58] Field of Search ............... 372/95, 108, 99, 40, 372/71

[56] References Cited
U.S. PATENT DOCUMENTS 4,360,925  11/1982  Brosnan et al. ............... 372/95
4,953,175  8/1990  De Silvestri et al. ............ 372/108

*Primary Examiner*—Rodney B. Bovernick
*Assistant Examiner*—Robert E. Wise
*Attorney, Agent, or Firm*—Heslin & Rothenberg

[57] ABSTRACT

The present invention features a slab laser apparatus having a stable/unstable resonator. The slab laser comprises a slab-shaped medium for producing a beam of coherent light. The slab-shaped medium is physically defined by an entrance end face; a rear, exiting end face; and two oppositely disposed and substantially parallel side faces. The respective end faces of the medium are disposed along an axis defining a "p" plane; the side faces are disposed along an axis defining an plane. A light beam entering at the entrance end face of the slab-shaped medium along the "p" plane axis reflects back and forth within the slab-shaped medium via total internal reflection, exiting at the rear end face. A stable optical cavity is defined for the "p" plane, comprising a hemispherical, high reflector curvature having an finite radius of curvature, and a flat, partially reflecting, outcoupler. An unstable optical resonator is defined for the plane, which operates in a low order transverse mode. The resonator in the plane consists of a high reflector mirror, and a negative radius of curvature, partially reflective mirror. The partially-reflecting outcoupler is a substantially cylindrical optical component onto which has been coated a variable reflectivity mirror (VRM) profile. The transmission of this mirror surface varies in the transverse direction. The optical component is flat in the "p" plane and cylindrical in the "s" plane. The VRM coating is disposed on the cylindrical face. The outside surface may be coated with an anti-reflective coating.

21 Claims, 2 Drawing Sheets

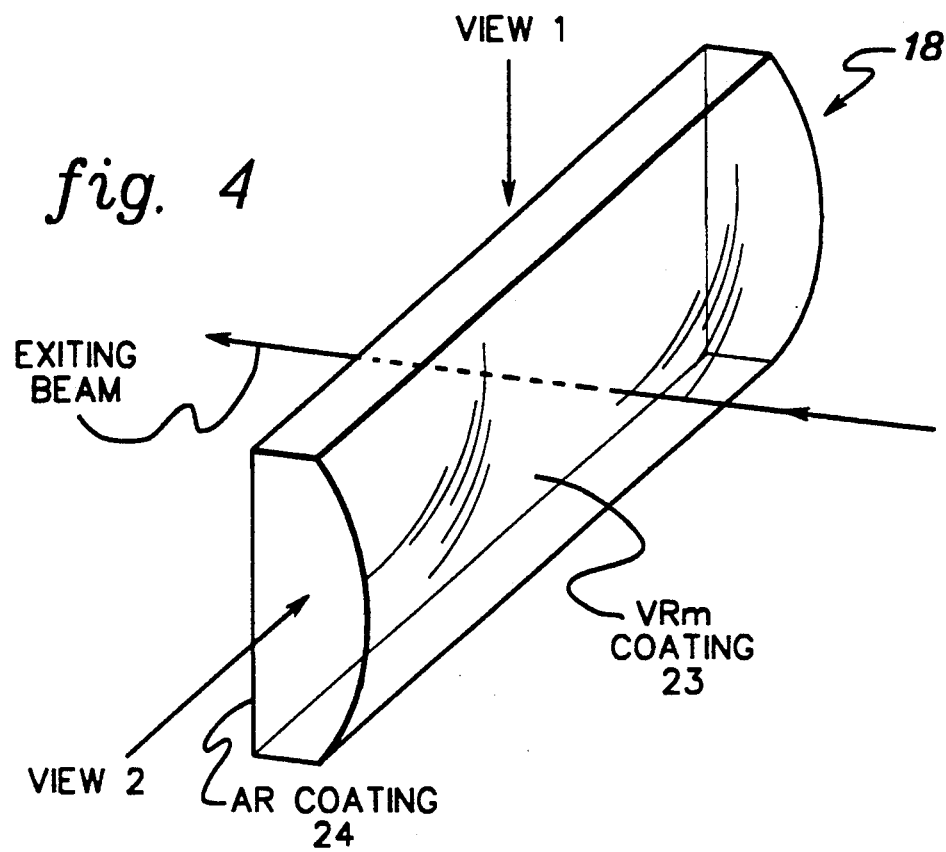
fig. 4
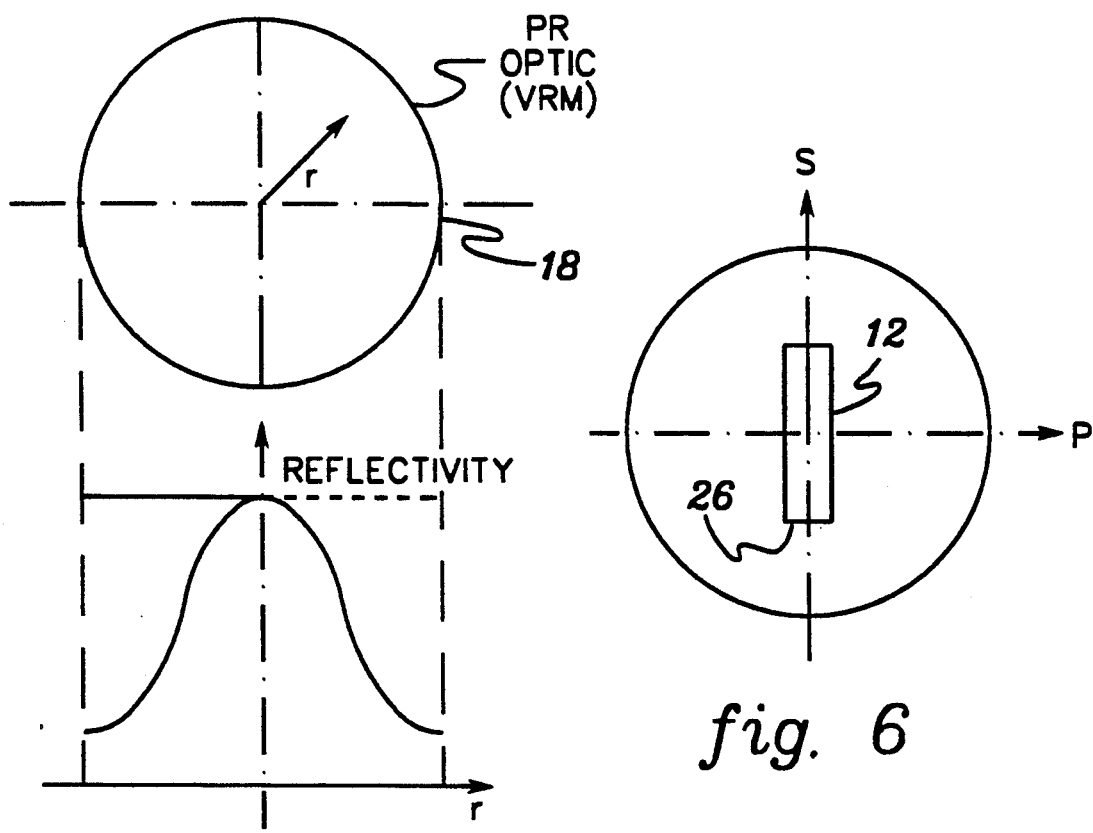
fig. 5
fig. 6

SLAB LASER

FIELD OF THE INVENTION

The present invention pertains to a slab laser of unique design, and, more particularly, to a slab laser having extremely high brightness and excellent beam quality.

BACKGROUND OF THE INVENTION

Slab laser design and usage are well known in the art. One such slab laser device is illustrated in U.S. Pat. No. 4,559,627, issued to Myung K. Chun on Dec. 17, 1985, entitled FACE-PUMPED RECTANGULAR SLAB LASER APPARATUS HAVING AN IMPROVED OPTICAL RESONATOR. Another such slab laser device is shown in U.S. Pat. No. 4,214,216, issued to William B. Jones, Jr., on Jul. 22, 1980, entitled FACE-PUMPED LASER WITH DIFFRACTION-LIMITED OUTPUT BEAM.

Despite the flurry of activity in this field, the current slab laser systems have not attained a performance level that is sufficient to produce a commercially viable apparatus.

A typical slab laser device is characterized as a laser medium having a configuration in the shape of a trapezoid or a parallelogram, which has engendered the "slab" colloquialism. The slab-configured medium is disposed in an optical resonator having two orthogonal planes: (a) a "s" plane (transverse); and (b) a "p" plane (total internal reflection, TIR). Coherent light that is usually introduced to the laser medium about its longitudinal axis is totally internally reflected back and forth between the upper and lower surfaces of the parallelogram, exiting from the rear face of the slab. The slab laser medium internally self-compensates for thermal effects in the "p" plane. In the "s" plane, however, thermal effects can severely limit the laser performance. Optical effects are usually controlled by the selection of mirror and lens shapes, the adjustment of the mirror locations to varying focal points of the resonator, and the control of thermal effects and resonant conditions with respect to "p" and "s" planes.

The slab laser system of the present invention has achieved superior results heretofore unavailable with the prior art devices illustrated by the aforementioned patents.

The laser system of the current invention provides extremely high beam brightness, as well as reliability. The laser beam of 500 watts of average power is capable of drilling untapered holes and cutting straight edges in hardened alloys, such as Inconel and Hastalloy, to depths exceeding two inches. Beam quality is but a few times the theoretical diffraction limit. In contrast, the current rod shaped high-power Yttrium Aluminum Garnet (YAG) lasers can drill and cut the same materials only to a maximum depth of 0.75 inches.

SUMMARY OF THE INVENTION

In accordance with the present invention, there is provided a slab laser apparatus having a stable/unstable resonator. The slab laser comprises a slab-shaped medium for producing a beam of coherent light. The slab-shaped medium is physically defined by an entrance end face; a rear, exiting end face; and two oppositely disposed and substantially parallel side faces. The respective end faces of the medium are disposed along an axis defining a "p" plane; the side faces are disposed along an axis defining an "s" plane. A light beam entering at the entrance end face of the slab-shaped medium along the "p" plane axis reflects back and forth within the slab-shaped medium via total internal reflection, exiting at the rear end face. A stable optical cavity is defined for the "p" plane, comprising a hemispherical, high reflector curvature having an finite radius of curvature, and a flat, partially reflecting, outcoupler. An unstable optical resonator is defined for the "s" plane, which operates in a low order transverse mode. The resonator in the "s" plane consists of a high reflector mirror, and a negative radius of curvature, partially reflective mirror. The partially-reflecting outcoupler is a substantially cylindrical optical component onto which has been coated a variable reflectivity mirror (VRM) profile. The terms "high", "partial" and "variable" refer to the reflectivity at the laser operating wavelength. The transmission of this mirror surface varies in the transverse direction. The optical component is flat in the "p" plane and cylindrical in the "s" plane. The VRM coating is disposed on the cylindrical face. The outside surface may be coated with an anti-reflective coating. The VRM coating may be fabricated to be circularly symmetric.

BRIEF DESCRIPTION OF THE DRAWINGS

A complete understanding of the present invention may be obtained by reference to the accompanying drawings, when considered in conjunction with the subsequent detailed description, in which:

FIG. 4 illustrates an enlarged view of the partially reflecting outcoupler shown in FIG. 3;

FIG. 5 is a graph of the transverse coating reflectivity for the outcoupler depicted in FIGS. 3 and 4; and FIG. 6 is a schematic view of the beam "footprint" as it exits the outcoupler.

DESCRIPTION OF THE PREFERRED EMBODIMENT

Generally speaking, the invention features a slab laser having a stable/unstable resonator. The laser has been designed to operate with a low order transverse mode in the "s" plane. This provides excellent beam quality and high brightness.

Figure 1:
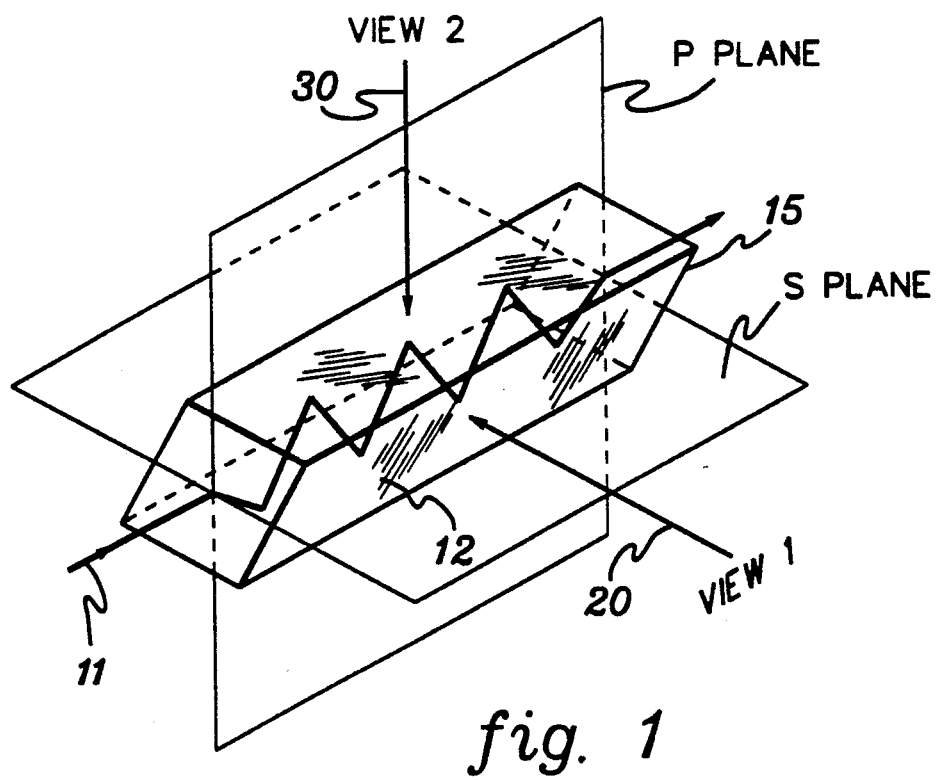
FIG. 1 illustrates a perspective, schematic diagram of a typical slab laser geometry in accordance with the invention.

Now referring to FIG. 1, a typical slab laser configuration is shown, defining the "p" and "s" planes of the resonator.

The slab 12 is internally self-compensating for thermal effects in the "p" plane. First-order thermal effects do not substantially degrade the laser beam quality or brightness. A light beam 11 entering at the face 13 of the slab 12 along the "p" plane normally reflects back and forth within the slab 12 and exits at the rear face 15. The slab 12 comprises a lasing medium of Neodymium-doped Yttrium Aluminum Garnet (Nd:YAG). Other materials, such as Neodymium-doped silicate or phosphate glasses, may be used in alternate embodiments.

Figure 2:
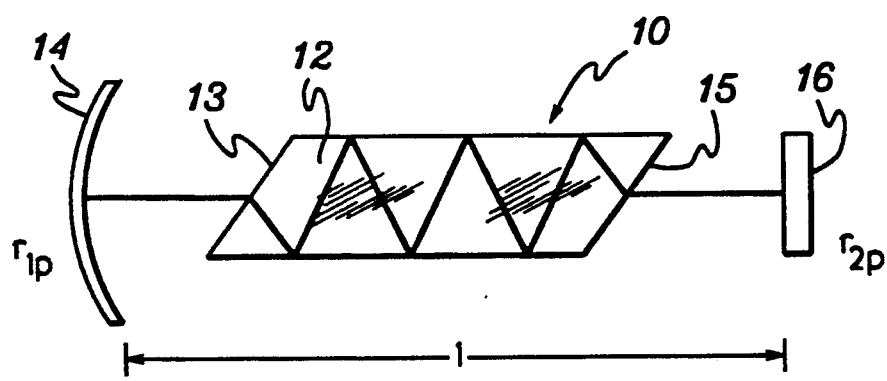
FIG. 2 is a side view ("p" plane) of the slab laser shown in FIG. 1, depicting one embodiment of the resonator construction in accordance with the invention.

Referring to FIG. 2, a view of the laser 10 of the invention is observed from the direction of the arrow 20 in FIG. 1.

The invention uses a hemispherical resonator in the "p" plane, comprising a high reflector (HR) 14 having a finite radius of curvature and a partially reflecting outcoupler 16 of infinite radius of curvature. The two respective mirrors 14 and 16 are separated by a distance "l". The resonator stability is defined by the product of the following equations:

$$g_{1p} = 1 - l/r_{1p};\ g_{2p} = 1 - l/r_{2p} \quad (1)$$

where:
l = the distance between the mirrors
$r_{1p}$ = the radius of curvature of the left-hand mirror
$r_{2p}$ = the radius of curvature of the right-hand mirror.

The resonator is stable if the product $g_{1p}g_{2p}$ is greater than zero and less than 1. For the slab laser shown in FIG. 2, the $g_{1p}$ for the curved mirror is between 0 and 1; the $g_{2p}$ for the flat mirror is 1, since $r_{2p}$ is infinite. The product of $g_{1p}g_{2p}$ is, therefore, between 0 and 1. The resonator oscillates with a low-order transverse mode and with excellent beam quality, usually two to three times the theoretical diffraction limit.

In the "s" plane, however, the laser slab does not provide internal self-compensation; thermal effects must be controlled by carefully designing the reflector directing the flashlamp power into the slab 12 in the transverse (arrow 20) direction.

Should a stable, hemispherical resonator be used in the "s" plane, the beam would operate with many transverse modes oscillating simultaneously. This would result in very poor beam quality, generally twenty to thirty times the diffraction limit.

In order to obtain excellent beam quality, the invention incorporates a laser that operates with a low-order transverse mode using an unstable resonator in the "s" plane.

Figure 3:
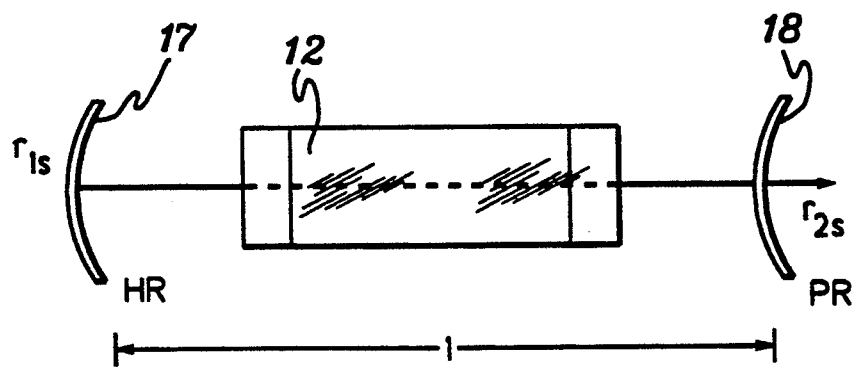
FIG. 3 depicts a schematic view of the resonator configuration for the "s" plane.

Referring to FIG. 3, the invention's resonator configuration for the "s" plane is shown. The resonator is viewed from the direction indicated by arrow 30, illustrated in FIG. 1. The resonator consists of a finite radius of curvature ($r_{1s}$) HR mirror; and a negative, finite radius of curvature ($r_{2s}$) PR mirror, separated by the distance "l". Referring to equation 1, and replacing p-subscripts with s-subscripts, the resonator is unstable, since the product of $g_{1s}g_{2s}$ is negative. Neglecting the refractive power of the slab 12, the radii of curvature ($r_{1s}$ and $r_{2s}$, respectively) of the resonator mirrors 17 and 18 and the resonator length "l" are related the following equation:

$$r_{1s} + r_{2s} = 2l \quad (2)$$

Referring to FIG. 4, the PR outcoupler 18 of FIG. 3 is illustrated as a cylindrical optical component onto which has been coated a VRM. The transmission of this mirror varies in the transverse direction. The optical component is flat in the "p" plane (along the direction shown by arrow 20 in FIG. 1) and cylindrical in the "s" plane (along the direction shown by arrow 30). The VRM coating is disposed on the cylindrical face 23. The outside surface 24 is coated with an anti-reflective coating. The VRM coating is fabricated to be circularly symmetric.

Referring to FIG. 5, a graph is shown of the coating reflectivity profile. The reflectivity is observed to peak at the center of the optical component tapering toward the edges. The value of the center reflectivity and the profile are chosen to provide optimum extraction from the slab.

Referring to FIG. 6, viewing the resonator from the direction of the VRM outcoupler 18 toward the slab 12, it is observed that, due to the large-aspect ratio of the slab, the reflectivity varies greatly in the transverse direction, or, "s" plane. In the "p" plane, the reflectivity does not vary more than approximately ±3%. It should also be noted that the slab 12 is oriented upon its edge 26, where the "s" plane is vertical and the "p" plane horizontal with respect to gravity.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A slab laser apparatus comprising:
    a slab-shaped lasing medium for producing a beam of coherent light radiation, said slab-shaped lasing medium having a beam entrance end face, a rear beam exiting end face and two oppositely disposed and substantially parallel side faces, said respective beam entrance and rear beam exiting end faces disposed along an axis defining a "p" plane, and said side faces disposed along an axis defining an "s" plane; and
    means defining a stable/unstable resonator cavity for said "p" and "s" planes respectively, wherein a light beam entering at the entrance end face of the slab-shaped lasing medium along an axis of the "p" plane, normally reflects back and forth within the slab-shaped medium and exits at the rear end face, said "p" plane resonator cavity comprising a substantially hemispherical, high-reflector resonator, and a substantially flat, partially reflecting, outcoupler, and said "s" plane resonator cavity operating in a single transverse mode comprising a high-reflector resonator, and a negative, partially reflecting outcoupler, said negative, partially reflecting outcoupler including a substantially cylindrical optical component having a variable reflectivity mirror surface.

2. The slab laser apparatus in accordance with claim 1, wherein said cylindrical optical component is substantially flat in the "p" plane and substantially cylindrical in the "s" plane.

3. The slab laser apparatus in accordance with claim 1, wherein said variable reflectivity mirror surface is disposed on a cylindrical face of said cylindrical optical component.

4. The slab laser apparatus in accordance with claim 3, wherein said variable reflectivity mirror surface is substantially circularly symmetric.

5. The slab laser apparatus in accordance with claim 1, wherein said cylindrical optical component comprises an anti-reflective surface.

6. The slab laser apparatus in accordance with claim 5, wherein said anti-reflective surface of said cylindrical optical component is operative at substantially 1,064 nm on an outside surface thereof.

7. The slab laser apparatus in accordance with claim 1, wherein said slab-shaped medium is oriented upon one of its side faces with the "s" plane being vertical and the "p" plane horizontal, with respect to a gravitational direction.

8. A slab laser apparatus comprising:
a slab-shaped lasing medium for producing a beam of coherent light radiation, said slab-shaped lasing medium having a beam entrance end face, a rear beam exiting end face, and two oppositely disposed and substantially parallel side faces, said respective beam entrance and rear beam exiting end faces disposed along an axis defining a "p" plane, and said side faces disposed along an axis defining an "s" plane; and
means defining a stable/unstable resonator cavity for said "p" and "s" planes respectively, wherein a light beam entering at the entrance end face of the slab-shaped medium along an axis of the "p" plane normally reflects back and forth within the slab-shaped medium and exits at the rear end face, said "p" plane resonator cavity comprising a high-reflector resonator, and a partially reflecting, outcoupler, and said "s" plane resonator cavity operating in a single transverse mode comprising a high-reflector resonator, and a negative, partially reflecting outcoupler, said negative, partially reflecting outcoupler including a substantially cylindrical optical component having a variable reflectivity mirror surface.

9. The slab laser apparatus in accordance with claim 8, wherein said cylindrical optical component is substantially flat in the "p" plane and substantially cylindrical in the "s" plane.

10. The slab laser apparatus in accordance with claim 8, wherein said variable reflectivity mirror surface is disposed on a cylindrical face of said cylindrical optical component.

11. The slab laser apparatus in accordance with claim 8, wherein said cylindrical optical component comprises an anti-reflective surface.

12. The slab laser apparatus in accordance with claim 8, wherein said anti-reflective surface of said cylindrical optical component is operative at substantially 1,064 nm on an outside surface thereof.

13. The slab laser apparatus in accordance with claim 8, wherein said variable reflectivity mirror surface is substantially circularly symmetric.

14. The slab laser apparatus in accordance with claim 8, wherein said slab-shaped medium is oriented upon one of its side faces with the "s" plane being vertical and the "p" plane horizontal, with respect to a gravitational direction.

15. A slab laser apparatus comprising:
a slab-shaped lasing medium for producing a beam of coherent light radiation, said slab-shaped lasing medium having a beam entrance end face, a rear beam exiting end face, and two oppositely disposed and substantially parallel side faces, said respective beam entrance and rear beam exiting end faces disposed along an axis defining a "p" plane, and said side faces disposed along an axis defining an "s" plane, said slab-shaped lasing medium being oriented upon one of its side faces with the "s" plane being vertical and the "p" plane horizontal, with respect to a gravitational direction; and
means defining a stable/unstable resonator cavity for said "p" and "s" planes respectively, wherein a light beam entering at the entrance end face of the slab-shaped medium along an axis of the "p" plane normally reflects back and forth within the slab-shaped medium and exits at the rear end face, said "p" plane resonator cavity comprising a high-reflector resonator and a partially reflecting outcoupler, and said "s" plane resonator cavity operating in a single transverse mode comprising a high-reflector resonator and a negative, partially reflecting outcoupler, said negative, partially reflecting outcoupler including an optical component having a variable reflectivity mirror surface.

16. The slab laser apparatus in accordance with claim 15, wherein said optical component comprises a substantially cylindrical optical component.

17. The slab laser apparatus in accordance with claim 16, wherein said cylindrical optical component is substantially flat in the "p" plane and substantially cylindrical in the "s" plane.

18. The slab laser apparatus in accordance with claim 16, wherein said variable reflectivity mirror surface is disposed on a cylindrical face of said substantially cylindrical optical component.

19. The slab laser apparatus in accordance with claim 15, wherein said optical component comprises an anti-reflective surface.

20. The slab laser apparatus in accordance with claim 19, wherein said anti-reflective surface of said optical component is operative at substantially 1,064 nm on an outside surface thereof.

21. The slab laser apparatus in accordance with claim 15, wherein said variable reflectivity mirror surface is substantially circularly symmetric.

* * * * *